(12) United States Patent
van Houtum

(10) Patent No.: US 10,003,440 B2
(45) Date of Patent: Jun. 19, 2018

(54) RECEIVER CIRCUIT

(71) Applicant: NXP B.V., Eindhoven (NL)

(72) Inventor: Wim van Houtum, Sint-oedenrode (NL)

(73) Assignee: NXP B.V., Eindhoven (NL)

( * ) Notice: Subject to any disclaimer, the term of this patent is extended or adjusted under 35 U.S.C. 154(b) by 0 days. days.

(21) Appl. No.: 15/403,887

(22) Filed: Jan. 11, 2017

(65) Prior Publication Data

US 2017/0214499 A1  Jul. 27, 2017

(30) Foreign Application Priority Data

Jan. 25, 2016  (EP) ..................................... 16152602

(51) Int. Cl.
*H04L 5/00* (2006.01)
*H04B 1/10* (2006.01)
(Continued)

(52) U.S. Cl.
CPC ......... *H04L 5/0007* (2013.01); *H04B 1/1027* (2013.01); *H04B 1/123* (2013.01); *H04B 1/16* (2013.01)

(58) Field of Classification Search
CPC ........ H04B 1/1027; H04B 1/123; H04B 1/16; H04L 5/0007; H04H 2201/17; H04H 2201/18; H04H 2201/19; H04H 2201/20
See application file for complete search history.

(56) References Cited

U.S. PATENT DOCUMENTS 6,259,893 B1  7/2001  Kroeger et al.
6,671,340 B1  12/2003  Kroeger et al.
(Continued)

OTHER PUBLICATIONS

Extended European Search Report for Patent Appln. No. 16152602.5 (dated Jul. 19, 2016).
(Continued)

*Primary Examiner* — Sophia Vlahos
(74) *Attorney, Agent, or Firm* — Rajeev Madnawat

(57) ABSTRACT

A receiver circuit comprising: an input terminal configured to receive an input-signal; an interfering-signal-strength-calculator configured to determine an interfering-signal-strength-indicator based on the input signal; a compensation-block configured to apply a co-channel-interference compensation operation to the input-signal in order to generate a compensated-input-signal; a compensation-weighting-component configured to apply a compensation-weighting-factor to the compensated-input-signal in order to generate a weighted-compensated-input-signal, wherein the compensation-weighting-factor is based on the interfering-signal-strength-indicator; a delay-block configured to apply a delay to the input-signal in order to generate a delayed-input-signal; a delayed-weighting-component configured to apply a delayed-weighting-factor to the delayed-input-signal in order to generate a weighted-delayed-input-signal, wherein the delayed-weighting-factor is based on the interfering-signal-strength-indicator; and a signal-combiner configured to combine the weighted-delayed-input-signal and the weighted-compensated-input-signal in order to provide a combined-input-signal for demodulation.

14 Claims, 6 Drawing Sheets

(51) Int. Cl.
*H04B 1/16* (2006.01)
*H04B 1/12* (2006.01)

(56) References Cited

U.S. PATENT DOCUMENTS

| 2012/0328057 A1* | 12/2012 | Kroeger | H04B 7/0805 |
| | | | 375/343 |
| 2015/0222382 A1 | 8/2015 | Van Houtum | |
| 2015/0303956 A1 | 10/2015 | Kroeger et al. | |

OTHER PUBLICATIONS

IBiquity Digital Corporation, "HD Radio(TM) Air Interface Description-Layer 1 FM, Rev. G", 133 pgs. (Aug. 23, 2011).
Consumer Electronics Association and National Association of Broadcasters, "National Radio Systems Committee, NIRSC-5-C, In-band/on-channel Digital Radio Broadcasting Standard", 53 pgs. (Sep. 2011).

* cited by examiner

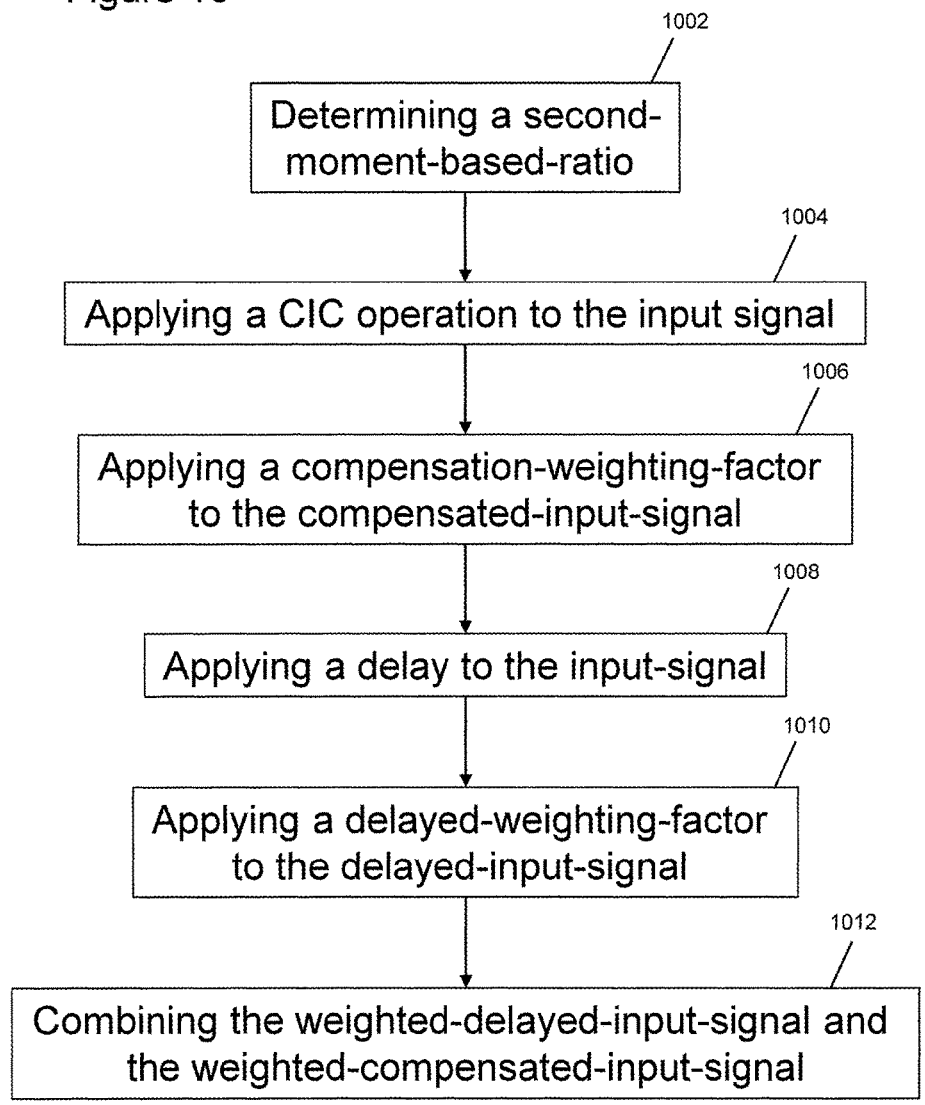

RECEIVER CIRCUIT

CROSS-REFERENCE TO RELATED APPLICATIONS

This application claims the priority under 35 U.S.C. § 119 of European Patent application no. 16152602.5, filed on Jan. 25, 2016, the contents of which are incorporated by reference herein.

The present disclosure relates to receiver circuits, including receiver circuits that provide co-channel-interference-compensation (CIC).

According to a first aspect of the present disclosure there is provided a receiver circuit comprising:
  an input terminal configured to receive an input-signal;
  an interfering-signal-strength-calculator configured to determine an interfering-signal-strength-indicator based on the input signal;
  a compensation-block configured to apply a co-channel-interference compensation operation to the input-signal in order to generate a compensated-input-signal;
  a compensation-weighting-component configured to apply a compensation-weighting-factor to the compensated-input-signal in order to generate a weighted-compensated-input-signal, wherein the compensation-weighting-factor is based on the interfering-signal-strength-indicator;
  a delay-block configured to apply a delay to the input-signal in order to generate a delayed-input-signal;
  a delayed-weighting-component configured to apply a delayed-weighting-factor to the delayed-input-signal in order to generate a weighted-delayed-input-signal, wherein the delayed-weighting-factor is based on the interfering-signal-strength-indicator; and
  a signal-combiner configured to combine the weighted-delayed-input-signal and the weighted-compensated-input-signal in order to provide a combined-input-signal for demodulation.

By using a weighted-combination of the compensated-input-signal and the delayed-input-signal, a good sensitivity-gain can be achieved.

In one or more embodiments the delayed-weighting-component, the compensated-weighting-component and the signal-combiner are configured to apply a blended weighting to the compensated-input-signal and the delayed-input-signal in accordance with the interfering-signal-strength-indicator.

In one or more embodiments the input signal comprises a digital upper-sideband signal or a digital lower-sideband signal of an in-band on-channel signal.

In one or more embodiments the digital upper-sideband signal and the digital lower-sideband signal comprise OFDM signals.

In one or more embodiments the receiver circuit further comprises a filter configured to receive a receiver-signal, and provide the input signal to the input terminal. The receiver signal may comprise an in-band on-channel signal that includes a central FM-signal, the digital upper-sideband signal, and the digital lower-sideband signal. The filter may be configured to filter out signals at frequencies that are outside those of the digital upper-sideband and the digital lower-sideband.

In one or more embodiments the interfering-signal-strength-indicator is configured to provide an indicator of the extent to which the input signal is an OFDM signal. The interfering-signal-strength-indicator may be configured to provide an indicator of the extent to which the input signal is a constant modulus signal.

In one or more embodiments the interfering-signal-strength-calculator comprises a second-moment-calculator. The interfering-signal-strength-indicator may comprise a second-moment-based-ratio. The second-moment-based-ratio may comprise the ratio between:
  the variance of the absolute value squared of the input signal ($E\{Y^2\}$); and
  the squared mean of the absolute squared value of the input signal (($E\{Y\})^2$).

In one or more embodiments the interfering-signal-strength-indicator can take a value between zero and one. The compensation-weighting-factor may be one minus the interfering-signal-strength-indicator. The delayed-weighting-factor may be the interfering-signal-strength-indicator.

In one or more embodiments the interfering-signal-strength-calculator is configured to:
  set the value of the interfering-signal-strength-indicator to a first value, which may be 1, for an input signal that is an OFDM signal;
  set the value of the interfering-signal-strength-indicator to a second value, which may be 0, for an input signal that is a constant-modulus signal; and
  set the value of the interfering-signal-strength-indicator to a value between the first value and the second value for an input signal that comprises both a constant-modulus signal and an OFDM signal.

In one or more embodiments the receiver circuit further comprises a demodulator configured to demodulate the combined-input-signal.

In one or more embodiments the compensation-block is configured to apply a Continuous Look Through algorithm to the input-signal in order to generate the compensated-input-signal.

There may be provided a method of processing an input signal, the method comprising:
  determining an interfering-signal-strength-indicator of the input signal;
  applying a co-channel-interference compensation operation to the input-signal in order to generate a compensated-input-signal;
  applying a compensation-weighting-factor to the compensated-input-signal in order to generate a weighted-compensated-input-signal, wherein the compensation-weighting-factor is based on the interfering-signal-strength-indicator;
  applying a delay to the input-signal in order to generate a delayed-input-signal;
  applying a delayed-weighting-factor to the delayed-input-signal in order to generate a weighted-delayed-input-signal, wherein the delayed-weighting-factor is based on the interfering-signal-strength-indicator; and
  combining the weighted-delayed-input-signal and the weighted-compensated-input-signal in order to provide a combined-input-signal for demodulation.

There may be provided a car radio receiver system comprising any receiver circuit disclosed herein, or configured to perform any method discloses herein.

There may be provided an integrated circuit or electronic device comprising any circuit or system disclosed herein.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying drawings in which:

FIG. 10 illustrates schematically an example embodiment of a method of processing an input signal.

The in-band on-channel (IBOC) digital radio broadcasting standard for the FM-band is defined by the FM-part of the "In-band/on-channel Digital Radio Broadcasting Standard" document published by National Radio Systems Committee (NRSC). This document is also the basis for the transmitted IBOC-signals that can be received by an HD Radio™ certified receiver. The HD Radio™ transmissions are also based on "HD Radio™ Air Interface Design Description Layer 1 FM", Doc. No.: SY_IDD_1011sG Rev. G, Aug. 23, 2011.

Figure 1:
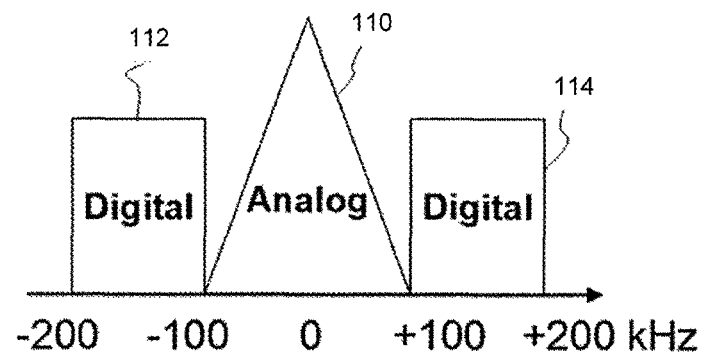
FIG. 1 shows a simplified form of one type of IBOC signal.

FIG. 1 shows a simplified form of one type of IBOC signal 100, which is the so-called "Hybrid IBOC FM" signal, and is denoted "Hybrid IBOC" in this document. Frequency is shown on the horizontal axis, with 0 Hz representing the carrier frequency. The vertical dimension of FIG. 1 represents power.

The hybrid signal 100 is a combination/addition of an analogue FM-signal 110 and a digitally-modulated signal 112, 114. The analogue FM-signal 110 occupies a bandwidth of 200 kHz, which is between −100 kHz and 100 kHz, and represents a central-part that is centred on the carrier frequency. The digitally-modulated signal 112, 114 occupies a bandwidth of roughly 200 kHz. However, the digitally-modulated signal is separated into a lower-sideband 112 and an upper-sideband 114, each with a bandwidth of roughly 100 kHz. The lower-sideband is spectrally positioned at a distance of 100 kHz below the carrier-frequency. The upper-sideband 114 is spectrally positioned at a distance of 100 kHz above the carrier-frequency. In this way, the lower-sideband 112 is below the lowest frequency of the central-part, and the upper-sideband 114 is above the highest frequency of the central-part. The digitally-modulated signal 112, 114 can use orthogonal frequency division multiplexing (OFDM), where the number of subcarriers can vary depending on the selected service/transmission-mode.

The total power of the digitally-modulated signal 112, 114 can be approximately a factor of a hundred smaller than the power of the analogue host-FM-signal 110. The hybrid IBOC signal 100 can therefore be considered as a noisy FM-signal.

A so-called "channel-grid" defines a reserved channel-bandwidth for an analogue FM-signal. The channel bandwidth in Band-II is 200 kHz by regulation, as shown by the analogue central parts 110 in FIG. 1. As a consequence, the lower and upper digital OFDM-sidebands 112, 114 can correspond to the frequency range of $1^{st}$ adjacent lower and upper neighbouring FM-channels. This will be described further with reference to FIGS. 2a and 2b.

Figure 2A:
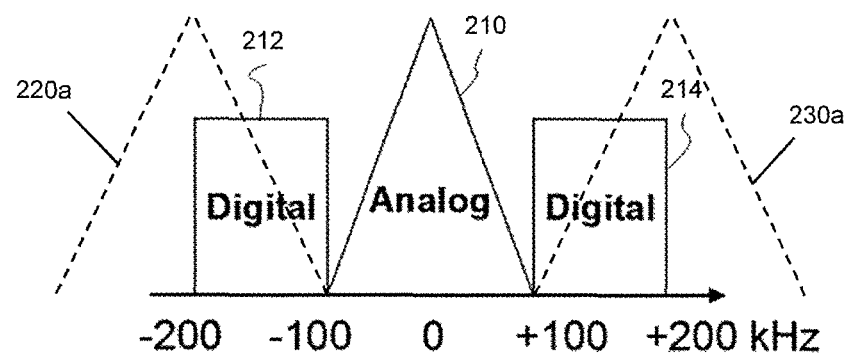
FIGS. 2a and 2b illustrates the IBOC signal of FIG. 1, along with a 1st adjacent lower and upper neighbouring FM-channels.

FIG. 2a illustrates the IBOC signal of FIG. 1, along with a 1st adjacent lower neighbouring FM-channel 220a, and a 1st adjacent upper neighbouring FM-channel 230a.

The primary sidebands 212, 214 of the (H)IBOC signal occupy roughly 100 kHz of the lower neighbouring channel 220a and roughly 100 kHz of the upper neighbouring channel 230a. Due to the fact that the primary sidebands 212, 214 are outside this 200 kHz grid, they are susceptible to interference by the neighbouring channels, that is 1st adjacent (FM)-interference. Thus, each $1^{st}$ adjacent (FM)-signal 220a, 230a of a (H)IBOC-transmission can introduce co-channel interference for the digitally modulated lower- and upper-sidebands 212, 214.

The co-channel interference, by regulation, can be up to a factor of a hundred stronger in power than the digitally-modulated lower- and upper-sidebands 212, 214. Moreover, both of the $1^{st}$-adjacent interference signals 220a, 230a can be present at the same time, thus the lower- and upper-sidebands 212, 214 are in this case both distorted by a neighbouring FM-transmission.

Figure 2B:
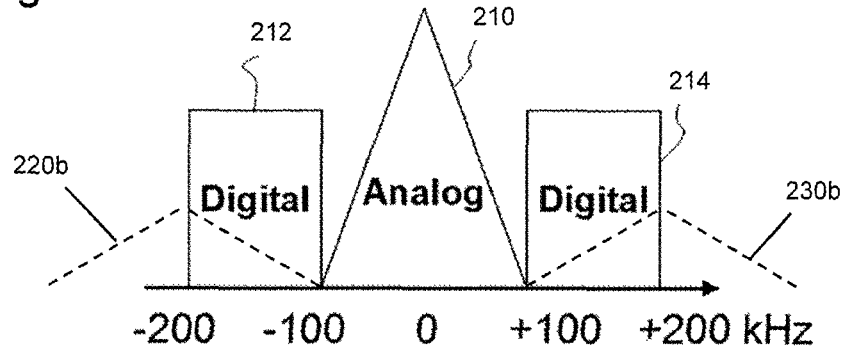

FIG. 2b illustrates an IBOC signal of FIG. 1, along with a 1st adjacent neighbouring FM-channels 220b, 230b. In contrast to FIG. 2a, the power of the 1st adjacent lower neighbouring FM-channel 220b and the 1st adjacent upper neighbouring FM-channel 230b is less than the respective digitally modulated lower- and upper-sidebands 212, 214 that they interfere with. As will be discussed below, the circuit of FIG. 7 can adequately decode signals irrespective of the strength of 1st adjacent neighbouring FM-channels 220b, 230b.

Figure 3:
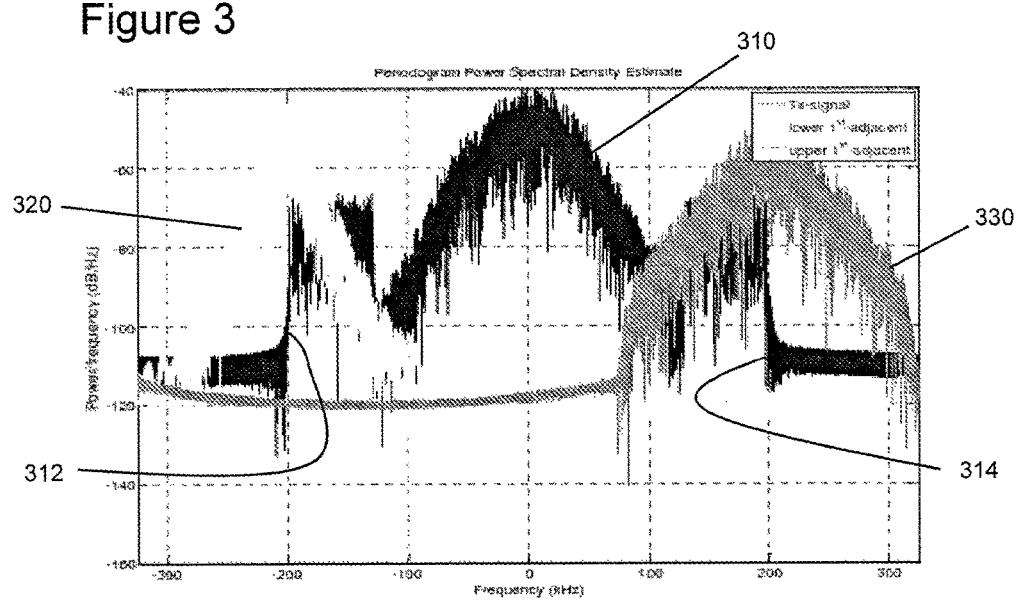
FIG. 3 shows a periodogram power spectral density (PSD) estimate of a (H)IBOC-transmission with lower and upper 1st-adjacent (FM)-interference signals.

FIG. 3 shows a periodogram power spectral density (PSD) estimate of a (H)IBOC-transmission with lower and upper $1^{st}$-adjacent (FM)-interference signals. Various portions of the signals in FIG. 3 have been given the same reference numbers as the corresponding portions of the signals shown in FIG. 2a.

FIG. 3 shows that indeed the lower- and upper-sidebands 312, 314 of the (H)IBOC transmission (black-curve) are heavily distorted by the lower $1^{st}$-adjacent neighbour FM-transmission 320 (light-grey curve) and the upper $1^{st}$-adjacent neighbour FM-transmission (dark-grey curve) 330, respectively.

"In-band on-channel" (IBOC) radio transmission systems can be used to transmit digital radio and analogue radio broadcast signals simultaneously on the same frequency. As will be discussed below, there is also an all-digital version in which two digital signals are combined. The term (H)IBOC is used in this document to refer to an IBOC signal which can be in hybrid or all-digital form.

Figure 4:
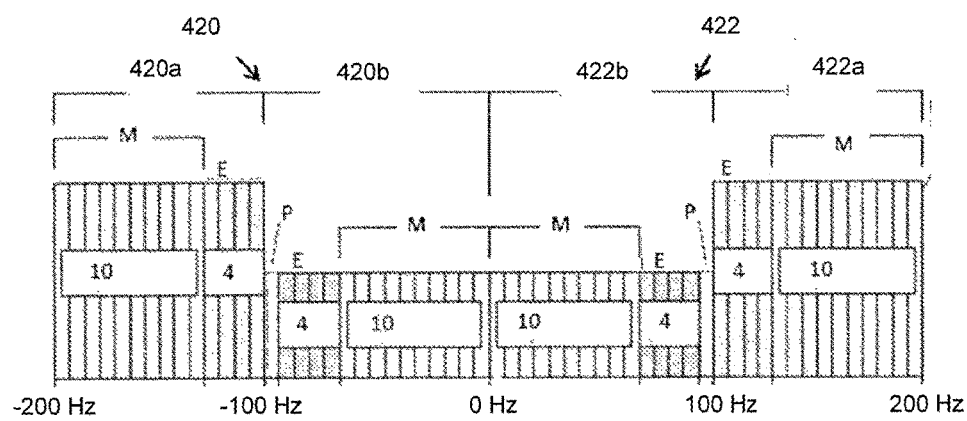
FIG. 4 shows a spectrum plot of an all-digital implementation of an IBOC signal.

FIG. 4 shows a spectrum plot of an all-digital implementation of an IBOC signal. For the all-digital IBOC FM signal, the analogue FM-signal is replaced by a (secondary) digitally-modulated signal 420b, 422b. In the all-digital mode, the bandwidth of the primary digital sidebands 420a, 422a is fully expanded with lower-power secondary sidebands.

The all-digital IBOC signal has a bandwidth of roughly 400 kHz. In the same way as described above with reference to FIG. 2a, approximately 100 kHz of each of the lower and upper adjacent channels is occupied (that is, the frequencies that are outside the 200 kHz "channel-grid"). The lower digital sideband of the all-digital IBOC signal is shown as 420 and the upper digital sideband is shown as 422. Each has a primary section 420a, 422a and a secondary section 420b, 422b. In FIG. 4, the number of extended frequency partitions (E) is fixed to 4. In a hybrid-mode system, for example as shown in FIGS. 1 and 2, the number of extended frequency partitions (E) can be; 0, 1, 2, or 4, depending on the transmitted service mode.

With an (H)IBOC transmission, in hybrid as well as in all-digital mode, the digitally modulated lower and upper sidebands can be based on a specific form of Coded-OFDM (COFDM). In a (H)IBOC-transmission the two (upper and lower) $1^{st}$-adjacent FM-signals are co-channel interference-signals for the digitally modulated COFDM-signals, since they reside at the same frequencies as the lower and upper sidebands of the (H)IBOC transmitted signal. Therefore, to be robust against these $1^{st}$-adjacent (FM) co-channel interference signals, the (H)IBOC-system can use a kind of co-channel-interference-compensation (CIC). The objective of the CIC is to reduce (or actually eliminate) the $1^{st}$-adjacent FM interference-signals so that the resultant signal can be used for OFDM-processing, demodulation, and decoding by, for example, a soft-decision Viterbi-decoder.

Figure 5:
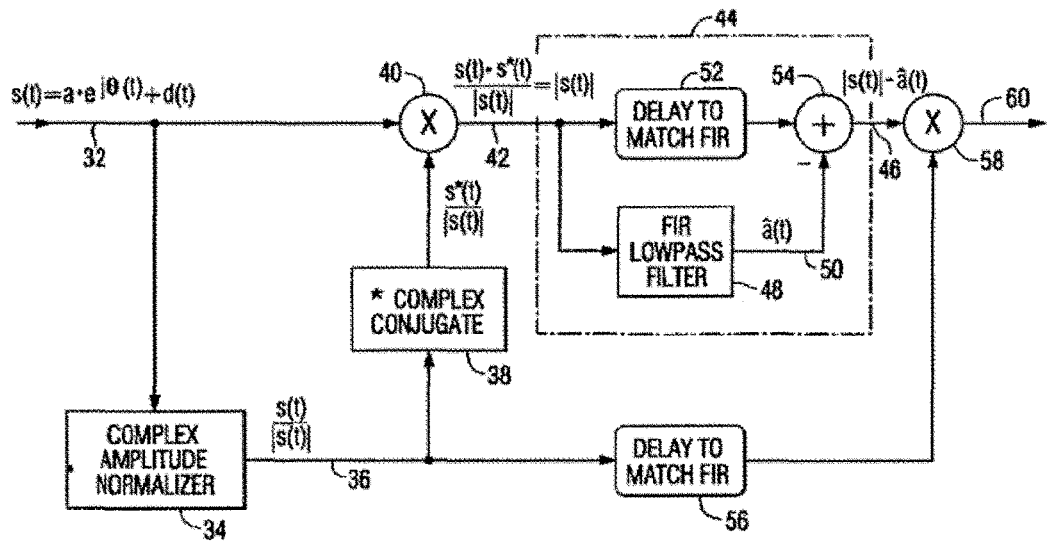
FIG. 5 shows an example circuit for applying a COntinuous Look Through (COLT) algorithm for co-channel-interference compensation (CIC)

FIG. 5 shows an example circuit for applying a COntinuous Look Through (COLT) algorithm for co-channel-interference compensation (CIC). The circuit is described in more detail in U.S. Pat. No. 6,259,893 B1, the contents of which are herein incorporated by reference.

As can be seen from FIG. 5, the COLT compensation algorithm makes use of the fact that the FM interference signal is a continuous-modulus signal. In fact, a closer look into FIG. 5 shows that the COLT-algorithm "weights" the distorted side-band signal with the ratio between the mean of the modulus and the modulus, according to:

$$s_{CIC}(t) \stackrel{def}{=} \left(1 - \frac{E\{|s(t)|\}}{|s(t)|}\right)s(t) = \left(1 - \frac{\overline{|s(t)|}}{|s(t)|}\right)s(t) \quad \text{Eq. 1}$$

where s(t) is the distorted side-band signal, i.e., the I and Q-time-samples of the shifted and filtered base-band input-signal, and E{.} is the statistical average.

Figure 6:
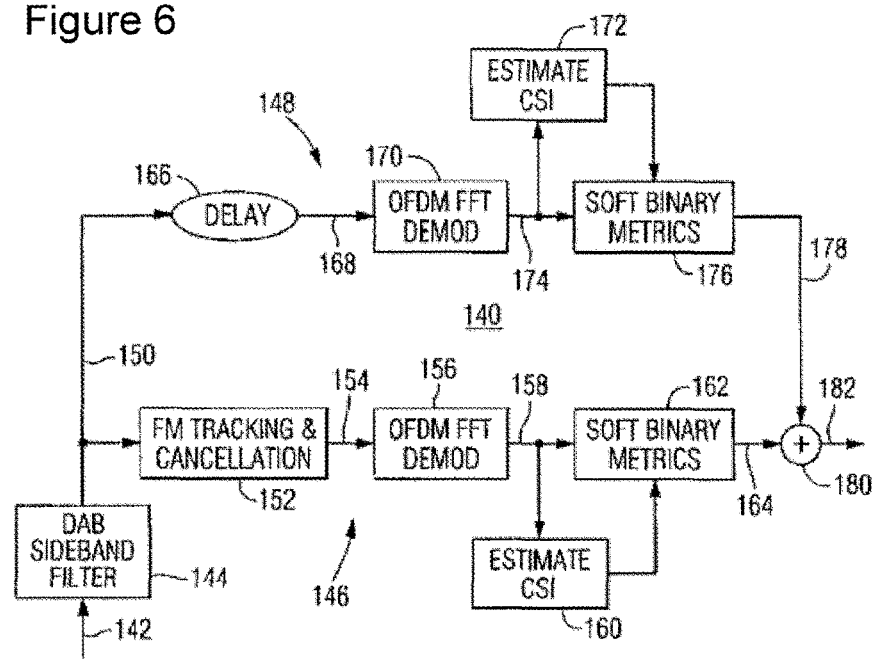
FIG. 6 shows an example circuit for performing co-channel-interference-compensation (CIC) for the digitally-modulated OFDM-parts of a (H)IBOC signal.

FIG. 6 shows an example circuit for performing co-channel-interference-compensation (CIC) for the digitally-modulated OFDM-parts of a (H)IBOC signal. The circuit of FIG. 6 relates to a two-path CIC-scenario that applies the COLT-principle of FIG. 5. The circuit of FIG. 6 is described in more detail in U.S. Pat. No. 6,671,340 B1, the contents of which are herein incorporated by reference.

In this circuit, a $1^{st}$ path 146 and a $2^{nd}$ path 148 are provided after a band-separation filter or "isolation-filters"—as represented by the DAB sideband filter 144 in FIG. 6.

The $2^{nd}$ path 148, the upper path as it is shown in FIG. 6, includes:
an OFDM FFT DEMOD block 170 for performing a fast Fourier transform (FFT) (thereby providing OFDM-processing) and demodulating the received signal;
an ESTIMATE CSI (channel-state-information) block 172 for performing channel-estimation; and
a SOFT BINARY METRICS block 176 for computing soft-decision information (i.e., log-likelihood-ratios (LLRs)) of each coded-bit.

The $1^{st}$ path 146, the lowest path as it is shown in FIG. 6, also includes an OFDM FFT DEMOD block 156, an ESTIMATE CSI block 160 and a SOFT BINARY METRICS block 162 that perform the same tasks as the corresponding blocks in the $2^{nd}$ path 148. In addition, the $1^{st}$ path 146 also includes a FM TRACKING AND CANCELLATION block 152 that performs CIC based on the COLT-principle as illustrated in FIG. 5. The "non-linear weighting", according to Eq. 1 above, that is applied by this COLT-based CIC processing will have an impact on the signal by changing the "channel-gain", "channel-phase" and the noise-component of the signal. To model these non-linear changes, we will treat the $2^{nd}$ path 148 as a path that might have an "independent-behaviour" with respect to the 1st path 146. Note, that this is an assumption since the statistics of the $2^{nd}$ path 148 originate from the same signal after the DAB SIDEBAND FILTER 144 and, therefore, the statistics are identical to that of the $1^{st}$ path 146. However, we assume that the non-linear COLT weighing impacts the signal in such a way that this signal-model (of the two different "independent" paths) might hold.

Furthermore, it is assumed for the signal-model that the cyclic prefix (CP) (which is a known part of the OFDM-symbol that is repeated to prevent or reduce Inter-Symbol-Interference (ISI)) completely eliminates any ISI and that there is no Inter-Carrier-Interference (ICI). The $2^{nd}$ path 148 has a delay block 166 that estimates the timing and frequency-offset that occurs in the $1^{st}$ path 146 due to the FM TRACKING AND CANCELLATION block 152 and applies a delay to the received signal in the $2^{nd}$-path 148 that compensates for the additional processing performed on the (H)IBOC-stream by the $1^{st}$ path 146. Therefore, for this two-path CIC-approach, the soft-decision bit-metrics that are calculated for each path can be combined with a summation block 180, which applies an addition in the frequency-domain. As can be seen from FIG. 6, this addition occurs after the soft-decision bit-metrics processing, which includes channel-state-information (CSI) estimation, is performed in each path.

As shown in FIG. 6, the $1^{st}$ path 146 includes CIC processing based on the COLT-principle, whereas, the $2^{nd}$ path 148 does not perform a CIC-operation. However, for both paths, a complete "receiver-chain" is present. This makes the circuit of FIG. 6 a very complex approach because a complete extra path is required for combining.

Figure 7:
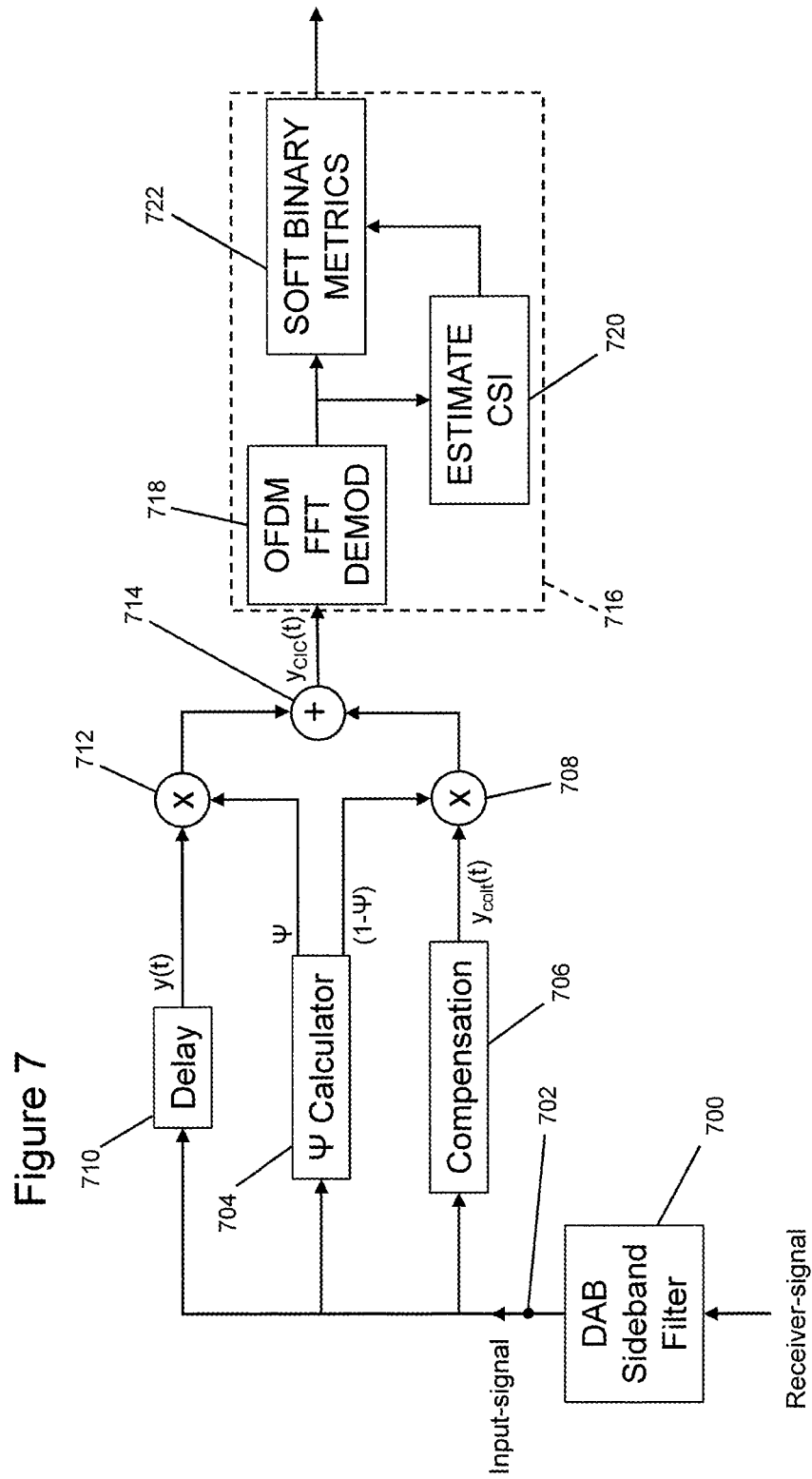
FIG. 7 shows an example embodiment of a receiver circuit.

FIG. 7 shows an example embodiment of a receiver circuit that has an input terminal 702 for receiving an input-signal. In this example, the circuit also includes an upstream DAB sideband filter 700 that receives a receiver-signal, and provides the input signal to the input terminal 702. The receiver signal comprises an H(IBOC) signal that includes a central FM-signal, the digital upper-sideband signal, and the digital lower-sideband signal. The DAB sideband filter 700 filters out signals at frequencies that are outside those of the digital upper-sideband or the digital lower-sideband. That is, the receiver circuit of FIG. 7 can be used for processing one of the digital upper-sideband and the digital lower-sideband. For processing the digital upper-sideband, the DAB sideband filter 700 is configured to pass frequencies that correspond to the upper sideband and its $1^{st}$-adjacent upper neighbouring FM-channel (for example, frequencies between +100 kHz and +300 kHz). Similarly, for processing the digital lower-sideband, the DAB sideband filter 700 is configured to pass frequencies that correspond to the lower sideband and its $1^{st}$-adjacent upper neighbouring FM-channel (for example, frequencies between −300 kHz and −100 kHz). In this way, the input signal comprises a digital sideband signal and any interference from a $1^{st}$ neighbouring FM signal (as shown in FIGS. 2a and 2b).

The circuit also includes an interfering-signal-strength-calculator that can determine an interfering-signal-strength-indicator. In this example, the interfering-signal-strength-calculator is a second-moment-calculator 704 that can determine a second-moment-based-ratio ($\psi$) of the input signal. The second-moment-based-ratio (which will be used for blending-purposes) can be defined as the ratio between:

(a) the variance of the absolute value squared of the input signal (a stochastic variable); and (b) the squared mean of the absolute squared value (that is, take to the $2^{nd}$-power the mean-value of the absolute squared-value) of the input signal.

As will be discussed in detail below, the second-moment-based-ratio can provide an indicator as to the strength of the 1st neighbouring FM signal relative to the digital sideband signals. In this example the second-moment-based-ratio ($\psi$) can take a value between 0 and 1, where:

0 represents the input signal being a constant modulus FM signal, which occurs when the $1^{st}$ neighbouring FM signal completely overpowers the digital sideband signals; and 1 represents the input signal being an OFDM ((H)IBOC)-signal, which occurs when there is no $1^{st}$ neighbouring FM signal.

In other examples, the interfering-signal-strength-indicator can be a different type of indicator for distinguishing between a desired signal type (for example an OFDM signal) and an interfering signal type (for example a constant-modulus signal). In some implementations, a higher-order moment based indicator (for example a third or fourth-moment-based-ratio) can be used.

FIG. 7 includes a compensation-block 706 that applies a co-channel-interference compensation (CIC) operation to the input-signal in order to generate a compensated-input-signal $y_{COLT}(t)$. In this example, the CIC operation is the COLT operation discussed above, although it will be appreciated that other CIC operation could be used. The compensated-input-signal $y_{COLT}(t)$ is provided to a compensation-weighting-component 708 that applies a compensation-weighting-factor to the compensated-input-signal $y_{COLT}(t)$ in order to generate a weighted-compensated-input-signal. In this embodiment the compensation-weighting-component 708 is a multiplier.

The compensation-weighting-factor is based on the second-moment-based-ratio. In this instance the compensation-weighting-factor is $(1-\psi)$. In this way, when the $1^{st}$ neighbouring FM signal is strong relative to the digital sideband signals ($\psi \approx 0$), then the weighted-compensated-input-signal is approximately equal to the compensated-input-signal $y_{COLT}(t)$. In contrast, when the $1^{st}$ neighbouring FM signal is weak relative to the digital sideband signals ($\psi \approx 1$), then the weighted-compensated-input-signal is approximately equal to zero.

The circuit of FIG. 7 also includes a delay-block 710 that applies a delay to the input-signal in order to generate a delayed-input-signal y(t). The length of the delay provided by the delay-block 710 corresponds to the delay that is incorporated by the compensation-block 706. In this way, the delayed-input-signal y(t) is synchronized with the compensated-input-signal $y_{COLT}(t)$. The delayed-input-signal y(t) is provided to a delayed-weighting-component 712 that applies a delayed-weighting-factor to the delayed-input-signal y(t) in order to generate a weighted-delayed-input-signal. In this embodiment the delayed-weighting-component 712 is also a multiplier.

The delayed-weighting-factor is also based on the second-moment-based-ratio. In this instance the delayed-weighting-factor is $\psi$; that is, it is the same as second-moment-based-ratio. In this way, when the $1^{st}$ neighbouring FM signal is strong relative to the digital sideband signals ($\psi \approx 0$), for example as shown in FIG. 2a, then the weighted-delayed-input-signal is approximately equal to zero. In contrast, when the $1^{st}$ neighbouring FM signal is weak relative to the digital sideband signals ($\psi \approx 1$), for example as shown in FIG. 2b, then the weighted-delayed-input-signal is approximately equal to the delayed-input-signal y(t).

The circuit also includes a signal-combiner 714 that combines the weighted-delayed-input-signal and the weighted-compensated-input-signal in order to provide a combined-input-signal $y_{CIC}(t)$. In this example the signal-combiner 714 is an adder block.

Since (i) the second-moment-based-ratio ($\psi$) can take a value between 0 and 1, (ii) the compensation-weighting-factor is set as $(1-\psi)$, and (iii) the delayed-weighting-factor is set as $\psi$, it will be appreciated that the sum of the weighted-delayed-input-signal and the weighted-compensated-input-signal represents a version of the input signal that has (a) a blend of information that has had CIC applied, and (b) a blend of information that has not had CIC applied. The extent of the blend is set by the relative strength of the 1st neighbouring FM signal.

The delayed-weighting-component 712, the compensated-weighting-component 708 and the signal-combiner 714 can be considered as applying a blended weighting to the compensated-input-signal $y_{COLT}(t)$ and the delayed-input-signal y(t) in accordance with the second-moment-based-ratio.

The circuit of FIG. 7 also includes a demodulator 716 for demodulating the combined-input-signal $y_{CIC}(t)$. In this example, the demodulator 716 includes an OFDM FFT DEMOD block 718, an ESTIMATE CSI block 720 and a SOFT BINARY METRICS block 722, in the same way as the circuits of FIGS. 5 and 6, as described above.

Advantageously, the circuit of FIG. 7 has eliminated the $2^{nd}$-path of FIG. 6, which includes a second demodulator and receiver chain. This reduces the complexity of the circuit, in some applications by nearly a factor of 2. Also, as will be illustrated below with reference to FIG. 9, the sensitivity-gain of the (H)IBOC-receiver can be improved. This elimination of the $2^{nd}$-path is possible by the generation of a single signal, which in this embodiment is a "weighted-combination" of the COLT-based CIC-processed signal and the, so called, "clean"-signal, i.e., the signal that was not processed by the COLT-operation.

This combined-weighting of a clean (H)IBOC-signal and a CIC-processed (H)IBOC-signal will be referred to as "$\chi^2$-blending". The principle of the $\chi^2$-blending is based on the fact that the first and second moment of the modulus of a constant-modulus signal are different to the first and second-moment of the modulus of an OFDM-signal. The $1^{st}$-adjacent lower and upper interference-signals of the (H)IBOC-signal are FM-signals, that are constant-modulus signals. In contrast, the lower and upper side-bands of a "clean" received (H)IBOC-signal (with no interference by FM signals) are digitally-modulated complex OFDM-signals. These complex OFDM-signals have a Gaussian distribution for their real (I)-component and the imaginary (Q)-component and, consequently, the squared-modulus will have a $\chi^2$-distribution, this is (clearly) not the case for a constant-modulus signal. Therefore, the weighted-combining can be based on the first and second-moment of the received (H)IBOC-signals.

In the following mathematical example, the weighted-combining is performed as a linear-weighting, i.e., "$\chi^2$-blending for co-channel-interference-compensation (CIC)", although it will be appreciated that in some examples non-linear weighting can also be used.

Firstly, we note that the received (H)IBOC-signal:

$$y(t) \stackrel{\text{def}}{=} I(t) + jQ(t) \qquad \text{Eq. 2}$$

where the I-component, as well as, the Q-component, both, have a Gaussian (i.e., normal) distribution with zero-mean and variance $\sigma_I^2 = \sigma_Q^2 \stackrel{\text{def}}{=} \sigma^2$. Further, since we are interested in the first and second moment of a $\chi^2$ random variable we define:

$$Y \stackrel{\text{def}}{=} |y(t)|^2 = y(t) \cdot y^*(t) = (I(t)+jQ(t)) \cdot (I(t)-jQ(t)) = I(t)^2 + Q(t)^2 \qquad \text{Eq. 3}$$

and Y becomes a summation of two independent stochastic variables each having an identical distribution. Hence, Y is the sum of two iid (independent and identically distributed) zero-mean Gaussian random variables with common variance $\sigma^2$ and then Y is a "$\chi^2$ random variable with 2 degrees of freedom". In addition, the mean and variance of Y are given by:

$$E\{Y\} \stackrel{\text{def}}{=} \overline{Y} = 2\sigma^2$$

$$VAR\{Y\} \stackrel{\text{def}}{=} E\{(Y-\overline{Y})^2\} = \sigma_y^2 = 4\sigma^4 \qquad \text{Eq. 4}$$

Now we rewrite the variance of Y:

$$VAR\{Y\} = E\{(Y-\overline{Y})^2\} = E\{(Y^2 - 2Y\overline{Y} + \overline{Y}^2)\} = E\{Y^2\} - (E\{Y\})^2 \qquad \text{Eq. 5}$$

and defining a specific $2^{nd}$-moment based ratio:

$$\psi \stackrel{\text{def}}{=} \frac{VAR\{Y\}}{(E\{Y\})^2} = \frac{E\{Y^2\}}{(E\{Y\})^2} - 1 \qquad \text{Eq. 6}$$

Note, in the case that the received-signal is an OFDM-signal, e.g., representing a (H)IBOC-signal without $1^{st}$-adjacent FM-signal, Y is a $\chi^2$ random variable with 2 degrees of freedom and the ratio $\psi$ evaluates to 1:

$$\psi = \frac{E\{Y^2\}}{(E\{Y\})^2} - 1 = 1, \text{ for an } OFDM((H)IBOC)\text{-signal} \qquad \text{Eq. 7}$$

However, if we evaluate Y when the received-signal is a constant-modulus (FM)-signal, e.g., representing a (H)IBOC-signal with a very strong $1^{st}$-adjacent FM-signal, then the ratio $\psi$ evaluates to 0:

$$\psi = \frac{E\{Y^2\}}{(E\{Y\})^2} - 1 = 0, \text{ for a constant-modulus (FM)-signal} \qquad \text{Eq. 8}$$

since Y is a (roughly) constant-value due to the fact that the received (input) signal is a constant-modulus signal. Now, we can apply the so called; "$\chi^2$-blending rule" that performs a linear weighing between the clean received (H)IBOC-signal and the COLT-processed received (H)IBOC-signal. Hence, the $\chi^2$-blending technique yields:

$$y_{CIC}(t) \stackrel{\text{def}}{=} (1-\psi) \cdot y_{COLT}(t) + \psi \cdot y(t) \qquad \text{Eq. 9}$$

where $y_{COLT}(t)$ represents the signal that is processed by the COLT-technique for CIC, for example the output-signal of the compensation-block of FIG. 7. Note, that we now have only one signal, $y_{CIC}(t)$, that needs further processing. Consequently, we only require one path for the OFDM-processing, i.e., FFT, demodulation, channel-estimation, CSI-estimation, and LLR-computations. This $\chi^2$-blending technique therefore saves a significant amount of computational complexity when compared with the circuit of FIG. 6

The blending process that is described above can generate a combined signal of the desired-signal and suppressed versions of the $1^{st}$-adjacent neighbours. This blended (combined)-signal can then be used for an LLR computation to generate accurate soft-decision information for a Viterbi-decoder.

Figure 8:
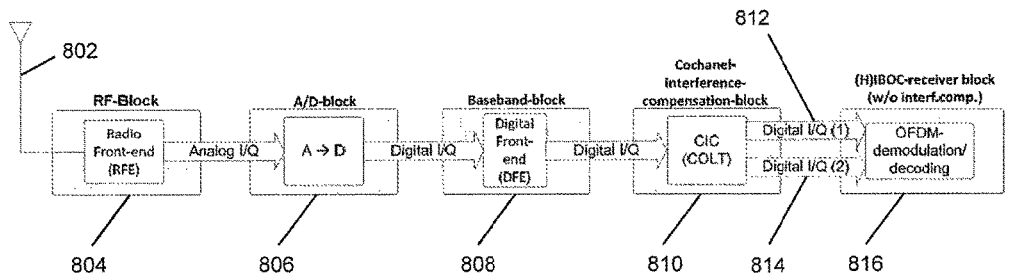
FIG. 8 shows an example embodiment of a block diagram of a two-path CIC receiver system.

FIG. 8 shows an example embodiment of a block diagram of a two-path CIC receiver system, in this example a car radio receiver system that incorporates the circuit of FIG. 6. The receiver system includes an antenna 802 that is coupled to an RF-block 804, which includes a radio front-end (RFE). The RFE provides an analogue I/Q signal to an A/D block 806. The AID block 806 provides a digital I/Q signal to a baseband block 808. The baseband block 808 includes a digital front-end (DFE) provides another digital I/Q signal to a co-channel-interference-compensation-block 810, which in this example performs a COLT operation to provide CIC. As shown in FIG. 8, the co-channel-interference-compensation-block 810 provides a first digital I/Q signal 812 and a second digital I/Q signal 814 to a H(IBOC)-receiver block 816 for OFDM demodulation and decoding. As shown in FIG. 6, two digital I/Q signals are decoded by separate receiver chains. The H(IBOC)-receiver block 816 in this example does not include interference compensation.

If the receiver system of FIG. 8 were changed to use the circuit of FIG. 7 (that applies $\chi^2$-blending) instead of the circuit of FIG. 6 (that does not apply $\chi^2$-blending), then the second digital I/Q signal 814 would no longer be required. Also, the H(IBOC)-receiver block 816 would only require a single receiver chain.

Figure 9:
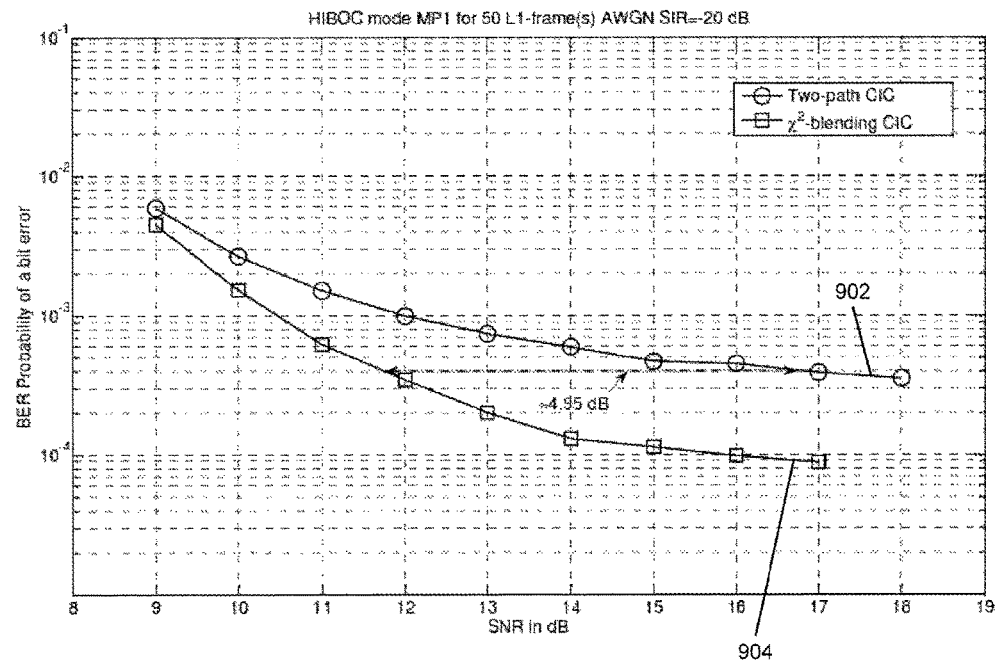
FIG. 9 shows the probability of a bit error for a stationary AWGN-channel with two strong 1st-adjacent FM interference signals.

FIG. 9 shows the probability of a bit error (bit error rate—BER) for a stationary AWGN-channel with two strong (Signal-to-Interference Ratio SIR=−20 dB) $1^{st}$-adjacent FM interference signals. A first plot 902 in FIG. 9 shows the results for a receiver system of FIG. 8 that includes the circuit of FIG. 6 (no $\chi^2$-blending), and therefore has two receiver chains in the receiver block. A second plot 904 shows the results for a receiver system of FIG. 8 that includes the circuit of FIG. 7 (with $\chi^2$-blending), and therefore has a single receiver chain in the receiver block. As can be seen, the probability of a bit error for the system that performs $\chi^2$-blending is reduced when compared with the system that does not perform $\chi^2$-blending. The newly-proposed $\chi^2$-blending CIC-algorithm can be seen to improve the performance of the (H)IBOC-receiver in the presence of strong $1^{st}$-adjacent interference signals.

It can be seen from FIG. 9 that the newly-proposed $\chi^2$-blending CIC-algorithm lowers the BER-floor compared to the two-path CIC approach. In this example, for a BER of $4 \cdot 10^{-4}$, an improvement in sensitivity of ≈4.95 dB is achieved. Note that the SNR sensitivity-values, that is the x-axis, shown by FIG. 9, are based on the digital-signal processing that is modeled in a simulator, for example the isolation-filters are based on a suppression that looks to meet the overall BER-performances of a conventional (H)IBOC-receiver.

The lower probability of a bit error (BER), with the same signal-to-noise ratio (SNR), of a (H)IBOC receiver as shown in FIG. 9 represents as improvement in sensitivity. The improvement in sensitivity can be because the receiver system can automatically adjust the degree of CIC applied based on the extent of interference that is taking place. Therefore, if there is only a small amount of interference, then only a small amount of CIC is performed. This can be advantageous because applying CIC to a signal that is not suffering from interference can in some instances degrade the quality of the signal.

FIG. 10 illustrates schematically an example embodiment of a method of processing an input signal, such as a (H)IBOC signal received by a car radio receiver system.

At step 1002, the method includes determining a second-moment-based-ratio of the input signal. As discussed above, a second-moment-calculator can be used to determine the second-moment-based-ratio, and can:

set the value of the second-moment-based-ratio to a first value, which is 1 in some examples, for an input signal that is an OFDM signal;

set the value of the second-moment-based-ratio to a second, different, value, which is 0 in some examples, for an input signal that is a constant-modulus signal; and set the value of the second-moment-based-ratio to a value between the first value and the second value for an input signal that comprises both a constant-modulus signal and an OFDM signal.

In this way, the second-moment-based-ratio can provide an indicator of the extent to which the input signal is an OFDM signal, and can also provide an indicator of the extent to which the input signal is a constant modulus signal. The second-moment-based-ratio can be representative of an expected amount of interference in the signal.

At step 1004, the method includes applying a co-channel-interference compensation operation to the input-signal in order to generate a compensated-input-signal. Then at step 1006, the method applies a compensation-weighting-factor to the compensated-input-signal in order to generate a weighted-compensated-input-signal. As above, the compensation-weighting-factor is based on the second-moment-based-ratio.

At step 1008, the method includes applying a delay to the input-signal in order to generate a delayed-input-signal. The delay can bring the delayed-input-signal into line with the compensated-input-signal. Then at step 1010, the method applies a delayed-weighting-factor to the delayed-input-signal in order to generate a weighted-delayed-input-signal. Again, the delayed-weighting-factor is based on the second-moment-based-ratio.

Then, at step 1012, the method combines the weighted-delayed-input-signal and the weighted-compensated-input-signal in order to provide a combined-input-signal for demodulation. As discussed above, this method can be considered as providing $\chi^2$-blending such that a single signal can be used for demodulation and decoding, whereby the single signal has an appropriate blend of the input signal both with and without CIC, based on the expected amount of interference in the signal.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A receiver circuit comprising:
an input terminal configured to receive an input-signal;
an interfering-signal-strength-calculator comprising a second-moment-calculator configured to determine an interfering-signal-strength-indicator as a second-moment-based-ratio based on the input signal;

a compensation-block configured to apply a co-channel-interference compensation operation to the input-signal in order to generate a compensated-input-signal;

a compensation-weighting-component configured to apply a compensation-weighting-factor to the compensated-input-signal in order to generate a weighted-compensated-input-signal, wherein the compensation-weighting-factor is based on the interfering-signal-strength-indicator;

a delay-block configured to apply a delay to the input-signal in order to generate a delayed-input-signal;

a delayed-weighting-component configured to apply a delayed-weighting-factor to the delayed-input-signal in order to generate a weighted-delayed-input-signal, wherein the delayed-weighting-factor is based on the interfering-signal-strength-indicator; and a signal-combiner configured to combine the weighted-delayed-input-signal and the weighted-compensated-input-signal in order to provide a combined-input-signal for demodulation.

2. The receiver circuit of claim 1, wherein the delayed-weighting-component, the compensated-weighting-component, and the signal-combiner are configured to apply a blended weighting to the compensated-input-signal and the delayed-input-signal in accordance with the interfering-signal-strength-indicator.

3. The receiver circuit of claim 1, wherein the input signal comprises a digital upper-sideband signal and a digital lower-sideband signal of an in-band on-channel signal.

4. The receiver circuit of claim 3, wherein the digital upper-sideband signal and the digital lower-sideband signal comprise OFDM signals.

5. The receiver circuit of claim 4, further comprising
a filter configured to receive a receiver-signal, provide the input signal to the input terminal, wherein the receiver signal comprises the in-band on-channel signal that includes a central FM-signal, the digital upper-sideband signal, and the digital lower-sideband signal, and filter out signals at frequencies that are outside those of the digital upper-sideband and the digital lower-sideband.

6. The receiver circuit of claim 1, wherein the interfering-signal-strength-indicator is configured to provide an indicator of an extent to which the input signal is an OFDM signal.

7. The receiver circuit of claim 1, wherein the interfering-signal-strength-indicator is configured to provide an indicator of an extent to which the input signal is a constant modulus signal.

8. The receiver circuit of claim 1, wherein the interfering-signal-strength-indicator has a value between zero and one, and the compensation-weighting-factor is one minus the interfering-signal-strength-indicator.

9. The receiver circuit of claim 1, wherein the delayed-weighting-factor is the interfering-signal-strength-indicator.

10. The receiver circuit of claim 1, wherein the interfering-signal-strength-calculator is configured to set the value of the interfering-signal-strength-indicator to a first value for an input signal that is an OFDM signal, set the value of the interfering-signal-strength-indicator to a second value for an input signal that is a constant-modulus signal, and set the value of the interfering-signal-strength-indicator to a value between the first value and the second value for an input signal that comprises both a constant-modulus signal and an OFDM signal.

11. The receiver circuit of claim 1, further comprising:
a demodulator configured to demodulate the combined-input-signal.

12. The receiver circuit of claim 1, wherein the compensation-block is configured to apply a Continuous Look Through algorithm to the input-signal in order to generate the compensated-input-signal.

13. A method of processing an input signal, the method comprising:
determining, with a second-moment-calculator, an interfering-signal-strength-indicator as a second-moment-based-ratio of the input signal;

applying a co-channel-interference compensation operation to the input-signal in order to generate a compensated-input-signal;

applying a compensation-weighting-factor to the compensated-input-signal in order to generate a weighted-compensated-input-signal, wherein the compensation-weighting-factor is based on the interfering-signal-strength-indicator;

applying a delay to the input-signal in order to generate a delayed-input-signal;

applying a delayed-weighting-factor to the delayed-input-signal in order to generate a weighted-delayed-input-signal, wherein the delayed-weighting-factor is based on the interfering-signal-strength-indicator; and combining the weighted-delayed-input-signal and the weighted-compensated-input-signal in order to provide a combined-input-signal for demodulation.

14. A car radio receiver system comprising the receiver circuit of claim 1.

* * * * *